United States Patent [19]

Lane

[11] Patent Number: 4,535,377

[45] Date of Patent: Aug. 13, 1985

[54] SHAFT VOLTAGE SUPPRESSION CIRCUIT

[75] Inventor: Lawrence J. Lane, Salem, Va.

[73] Assignee: General Electric Company, Salem, Va.

[21] Appl. No.: 594,214

[22] Filed: Mar. 28, 1984

[51] Int. Cl.³ .............................................. H02H 9/00
[52] U.S. Cl. ........................................ 361/1; 361/23; 363/53
[58] Field of Search ..................... 361/1, 2, 23, 91, 33, 361/159, 212, 220; 318/345 G; 307/89, 90, 95; 363/53, 54, 84, 86, 88

[56] References Cited

U.S. PATENT DOCUMENTS

| | | | |
|---|---|---|---|
| 3,551,781 | 12/1970 | Smith | 363/53 |
| 3,697,820 | 10/1972 | Ehret | 361/159 |
| 4,287,551 | 9/1981 | Watanabe | 361/212 |

Primary Examiner—Harry E. Moose, Jr.

Attorney, Agent, or Firm—Arnold F. Renner

[57] ABSTRACT

A shaft voltage suppression circuit is used with electrical motors or generators of the type including a field winding supported by a shaft which is movable within bearings, which motor or generator is supplied by way of relatively positive and negative buses with electrical power from a source including an electrical power conversion bridge having controlled rectifiers and uncontrolled rectifiers. The shaft voltage suppression circuit includes a first series combination of a first resistor and a first capacitor connected between the positive bus and a common voltage. A second series combination of a second resistor and a second capacitor is connected between the negative bus and the same common voltage and a unidirectional current conductor is connected in parallel with the second resistor such that there is established a low resistance path for current to pass from the negative bus to the common voltage.

9 Claims, 3 Drawing Figures

SHAFT VOLTAGE SUPPRESSION CIRCUIT

BACKGROUND OF THE INVENTION

The present invention relates generally to voltage suppression networks and more particularly to a circuit for suppressing the voltage coupled to a motor or generator shaft to a value sufficient to eliminate the arcing between the shaft and its bearings.

One typical motor or generator structure includes a field winding mounted on a shaft which is moveable, with respect to the stationary portions of the machine, within suitable bearings. Although the field winding is electrically insulated from the shaft, there are, nonetheless, voltages which are capacitively coupled to the shaft from the energized winding. In high voltage machines (e.g., 460 volts and above) this coupled voltage can be relatively high, for example 80 volts or more, such that arcing between the shaft and the bearings can result in pitting of the shaft and/or bearings, thus, resulting in early motor failure. It has been found that voltages as low as eight volts may, in certain instances, result in such arcing and pitting.

It has long been known in the art to provide what is known as a shaft voltage suppressor network or circuit. One form of the shaft voltage suppressor includes two legs, each including the series combination of a resistor and a capacitor, which two legs are also connected in series with the total series combination being connected in parallel with the field winding. The common point of the two legs is connected to a common voltage point such as earth ground. Such shaft voltage suppression networks function quite adequately in those situations where the field is supplied from a balanced source such as the well known six-thryristor rectifying bridge connected to a three-phase line voltage. When, however, a hybrid rectifying bridge, for example one including three controlled rectifiers (e.g., thyristors) and three uncontrolled rectifiers (e.g., diodes) is used, the non-symmetry of the bridge causes different field voltage waveforms. In this situation the known shaft voltage suppression circuit such as that described above is incapable of appropriately reducing the voltage coupled to the shaft such that once again arcing and the pitting of the component results.

SUMMARY OF THE INVENTION

It is, therefore, an object of the present invention to provide an improved shaft voltage suppression circuit.

It is another object to provide a circuit capable of suppressing voltages coupled to the shaft of a motor or generator to a level insufficient to cause arcing between the shaft and supporting or associated components.

It is a further object to provide a shaft voltage suppression circuit particularly adapted for use with a machine having a field winding supplied by a hybrid rectifier bridge which bridge includes both controlled and uncontrolled rectifying elements.

The foregoing and other objects are achieved in accordance with the present invention by providing a shaft voltage circuit for use with an electric motor or generator of the type which includes a field winding supported upon a shaft which in turn is movably supported within bearings and which is supplied by way of relative positive and negative buses from an electrical power source including a power conversion bridge having both controlled and uncontrolled rectifiers. This suppression circuit includes first and second series combinations of resistors and capacitors which series combinations are in turn connected in series and connected across the machine field winding with their common center point being connected to a common voltage such as earth ground. There is further included a unidirectional current conducting means, such as a diode, connected in parallel with the resistor of the leg connected between the negative bus and ground and which is poled in a direction to conduct from the negative bus to ground.

BRIEF DESCRIPTION OF THE DRAWINGS

While the present invention is defined in particularity in the claims annexed to and forming a part of this specification, a better understanding can be had from the following description taken in conjunction with the accompanying drawings in which:

DETAILED DESCRIPTION

Figure 1:
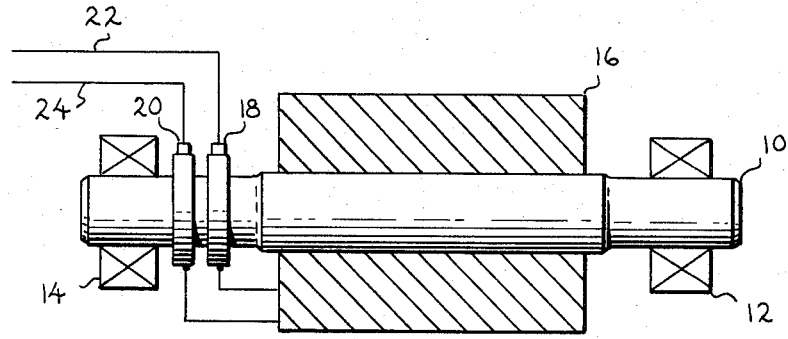
FIG. 1 is a schematic representation of the physical structure for a rotary electric machine supported by bearings.

Reference is first made to FIG. 1 which shows in schematic form the physical representation of a typical motor or generator rotor structure. This figure is included solely for orientation purposes. As illustrated, there is included a center shaft 10 which is supported by suitable bearing means 12 and 14, respectively, located near each end of the shaft. Bearings 12 and 14 may be of any suitable type as sleeve, roller or ball. Supported on shaft 10 is a field winding 16 which is electrically insulated from the shaft. Electrical power is supplied to the field winding 16 by way of suitable slip rings 18 and 20 which are provided with electrical power by way of lines 22 and 24 from a source not shown in FIG. 1. As will be more clearly illustrated in FIG. 2 and as is well known in the art, although the field 16 is electrically insulated in the shaft 10, voltages are capacitively coupled to that shaft from the energized field winding. There also exists coupling between the shaft and its bearings 12 and 14 which may be represented by the parallel network of a resistor and a capacitor with the capacitor representing the capacitive coupling between the two elements and the resistor representing the resistance of any oil and air layer existing between the shaft and its bearing.

Figure 2:
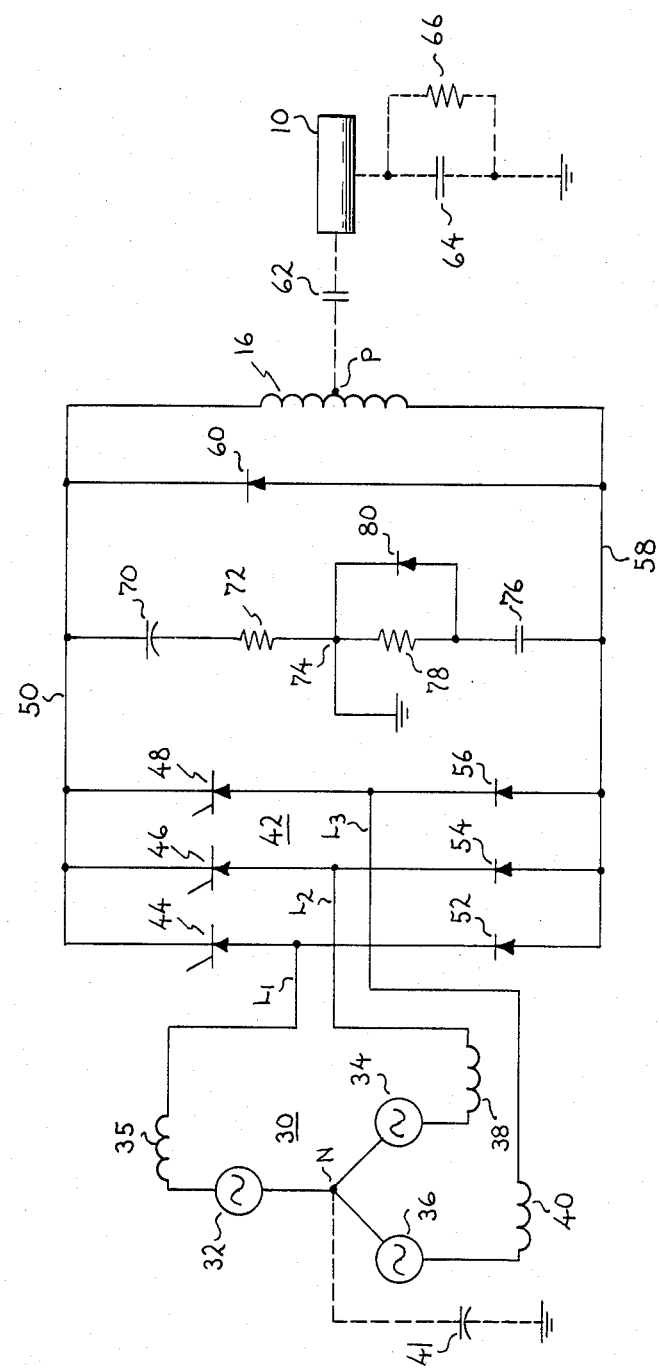
FIG. 2 is a schematic diagram illustrating the present invention in its preferred embodiment; and, FIG. 3 depicts waveshapes helpful in understanding the operation of the shaft voltage suppression circuit of the present invention.

FIG. 2 illustrates the present invention in its preferred embodiment in a typical environment. As illustrated in FIG. 2, there is provided the thevenin equivalent of a three-phase power supply 30 comprised of balanced voltages 32, 34 and 36 with associated series inductances 35, 38 and 40. The power supply 30 is shown as a wye connection of voltages with a mid or neutral point N. Employing the convention to be used in this description, depicted in phantom is a capacitance 41 connected between a common voltage (earth ground) and the neutral point N. Such phantom depictions are used in this specification to illustrate electrical circuit factors which do not exist as physical entities but which are present in an electrical sense. In this case, capacitance 41 represents the stray capacitance between the power supply 30 and ground.

Power supply 30 is connected by way of lines $L_1$, $L_2$ and $L_3$ to a three-phase rectification bridge, indicated generally at 42, which includes three controlled rectifiers 44, 46 and 48 connecting the power supply 30 to a positive bus 50 and three uncontrolled rectifiers 52, 54 and 56 which connect a negative bus 58 to $L_1$, $L_2$ and $L_3$.

As shown in FIG. 2, the field winding 16 is energized by being connected to the positive bus 50 and the negative bus 58. (For sake of simplicity, the slip rings 18 and 20 have been omitted.) Connected in parallel with the field winding 16 is the free-wheeling diode 60 poled to conduct current from the negative bus 58 to the positive bus 50. This diode permits field winding current during periods when none of the controlled rectifiers 44, 46 or 48 is conducting.

Shaft 10 is capacitively coupled to the field winding 16 by stray capacitance illustrated in phantom as capacitor 62 connected between point P, the electrical center of the field winding 16, and the shaft 10. Actually, the stray capacitance represented by capacitor 62 would be distributed along the length of the field winding and the shaft but for electrical purposes, it may be represented in the manner shown in FIG. 2. Also shown in FIG. 2, in phantom representation, is a capacitor 64 and a resistor 66, the parallel combination being connected between the shaft 10 and the common voltage or ground, and representing respectively the capacitance and resistance of the air and oil gap between the shaft and its bearings.

Completing the depiction of FIG. 2 is the shaft voltage suppression circuit of the present invention. This is shown as being connected between the positive bus 50 and the negative bus 58 in parallel with the field winding 16 and the free-wheeling diode 60. The shaft voltage suppression network includes a first leg including a capacitor 70 and a resistor 72 connected in series between the positive bus and a node 74 which is connected to a common voltage shown as earth ground. A second leg of the shaft voltage suppression circuit includes a capacitor 76 and a resistor 78 connected in series between the negative bus 58 and node 74. Further included is a unidirectional conducting device, shown as a diode 80, which is connected in parallel with resistor 78 of the second leg to thereby provide a low impedance path from the negative bus 58 to the common node 74. Thus, when the negative bus 58 is positive with respect to the voltage at node 74, there is a low impedance path comprised of capacitor 76 and diode 80. When bus 50 is positive with respect to bus 58, the current path through the two legs including capacitor 70, resistor 72, resistor 78, and capacitor 76 is high impedance as compared to the path including diode 80. This particular combination, as may be best seen with respect to the waveforms of FIG. 3, provides the shaft voltage suppression network of the present invention and serves to maintain the voltage on the shaft 10 at a value below that which will cause arcing between the shaft and its bearings and hence the deteriorating effects of pitting resulting from such arcing.

Figure 3:
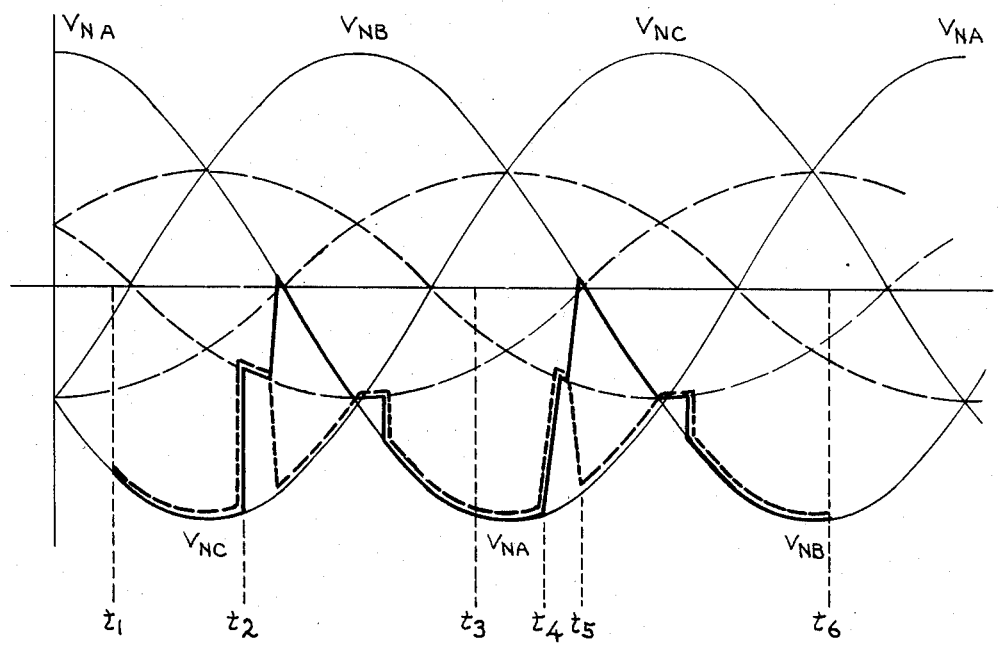

FIG. 3 compares the operation of the shaft voltage suppression circuit of the present invention with that previously known. Shown in FIG. 3 are the three neutral to line voltages of the supply designated, respectively, $V_{NA}$, $V_{NB}$ and $V_{NC}$. The waveshapes depicted between $t_1$ and $t_3$ are for operation of the circuit without the diode 80 while the depiction between $t_3$ and $t_6$ is the improvement including the diode 80. In FIG. 3, the heavy solid line depicts voltage on the positive bus 50 while the heavy dashed line shows the voltage on the negative bus 58. It is seen that there normally exists at least a slight separation of the two bus voltages which represents the voltage drop across diode 60.

Looking first at the period between times $t_1$ and $t_3$, it is seen that at time $t_2$, the time of rendering conductive a one of the thyristors 44, 46 and 48, the voltage at both ends of the field, that is voltage on the two buses 50 and 58, changes abruptly in the positive direction. Thus, the voltage at point P, also steps upwardly. This step occurs almost instantaneously and, without the existence of the diode 80, the change would be so fast that the voltage of capacitor 41 could not step fast enough to change the voltage at node N. As such, a large voltage differential will exist between the shaft and the bearings which are at ground potential with the result that arcing between the shaft and bearings will occur.

In order to prevent this arcing it is, therefore, necessary to decrease the rate of voltage change between the shaft and ground. In accordance with the present invention, diode 80 is connected in parallel with the resistor 78 such that, as shown at time starting at $t_4$ in the period between $t_3$ and $t_6$, the rate of change of the voltage on the two buses 50 and 58 is considerably lower than when the diode is omitted. This reduced rate of change of voltage starting at time $t_4$ causes the voltage at point P to be dropped across capacitor 62 instead of across capacitor 62 and capacitor 64 in series because resistor 66 permits considerable conduction to thus maintain the shaft voltage at a tolerable level. During the period following time $t_5$, the shaft voltage suppression circuit operates in the method of the prior art. For the brief interval immediately after time $t_4$, however, the significant advantage of the present invention is realized.

While the present invention has been described in its preferred embodiment, modifications thereto will readily occur to those skilled in the art. For example, although the invention has been depicted with respect to a rotating motor, the present invention would have equal applicability to a linear motor. It is not desired therefore that the present invention be limited to this specific arrangement shown and described but it is intended to cover within the appended claims all such modifications as fall within the true spirit and scope of the present invention.

I claim:

1. For use with electric motors and generators, of the type including a field winding supported by a shaft which is movable within bearings, which is supplied by way of relative positive and negative buses with electrical power from a source including an electrical power conversion bridge having controlled rectifiers and uncontrolled rectifiers, circuit means for suppressing voltages coupled to said shaft from said field winding, said circuit means comprising:

(a) a first series combination of a first resistor and a first capacitor connected between said positive bus and a common voltage;

(b) a second series combination of a second resistor and a second capacitor connected between said negative bus and said common voltage; and, (c) means associated with said second series combination to establish a low impedance path including said second capacitor for currents flowing from the negative bus to the common voltage and a path having a high impedance relative to said low impedance path including said second resistor and said second capacitor for currents flowing from said common voltage to said negative bus.

2. The invention in accordance with claim 1 wherein said means associated with said second series combination includes a unidirectional current carrying device poled to conduct current from said negative bus to said common voltage.

3. The invention in accordance with claim 2 wherein said unidirectional current carrying device comprises a diode.

4. The invention in accordance with claim 3 wherein said diode is connected in parallel with said second resistor.

5. The invention in accordance with claim 1 wherein said common voltage is earth ground.

6. The invention in accordance with claim 2 wherein said common voltage is earth ground.

7. The invention in accordance with claim 3 wherein said common voltage is earth ground.

8. The invention in accordance with claim 1 further including a diode connected in electrical parallel with said field winding.

9. The invention in accordance with claim 1 wherein the series arrangement of said first and second series combinations is connected in parallel with said field winding.

* * * * *